US012762637B1

(12) United States Patent
Townsend, III et al.

(10) Patent No.: US 12,762,637 B1
(45) Date of Patent: Oct. 13, 2026

(54) PRIVILEGE AUTHENTICATION SYSTEMS AND TECHNIQUES FOR COMMUNICATIONS TO CONFINEMENT INSTITUTION INMATES

(71) Applicant: Confinement Telephony Technology, LLC, Greensboro, NC (US)

(72) Inventors: John Vincent Townsend, III, Kernersville, NC (US); Timothy Edwin Pabon, Greensboro, NC (US); Rick Allen Lubbehusen, Winston-Salem, NC (US); Eugene B. Joswick, III, Marietta, GA (US)

(73) Assignee: Confinement Telephony Technology, LLC, Greensboro, NC (US)

( * ) Notice: Subject to any disclaimer, the term of this patent is extended or adjusted under 35 U.S.C. 154(b) by 0 days.

(21) Appl. No.: 18/916,840

(22) Filed: Oct. 16, 2024

Related U.S. Application Data

(60) Provisional application No. 63/544,345, filed on Oct. 16, 2023.

(51) Int. Cl.
*G06Q 50/60* (2024.01)

(52) U.S. Cl.
CPC .................................... *G06Q 50/60* (2024.01)

(58) Field of Classification Search
CPC ...................................................... G06Q 50/60
See application file for complete search history.

(56) References Cited

U.S. PATENT DOCUMENTS 5,917,925 A 6/1999 Moore
6,285,777 B2 9/2001 Kanevsky
6,463,127 B1 10/2002 Maier
(Continued)

FOREIGN PATENT DOCUMENTS

CN 101511001 A 8/2009
CN 201374782 Y 12/2009
(Continued)

OTHER PUBLICATIONS

"A Method of Uniquely Identifying Postal Items" (Apr. 20, 2011), The IP.com Journal. Retrieved from <https://priorart.ip.com/IPCOM/000206366> on Jan. 9, 2026. (Year: 2011).*
(Continued)

*Primary Examiner* — George Chen
*Assistant Examiner* — Tayar M Kyu
(74) *Attorney, Agent, or Firm* — Thompson Hine LLP

(57) ABSTRACT

Some implementations disclosed herein reduce the chances of misuse and abuse of privileged postal mail processes by authenticating incoming mail that purports to be privileged mail actually as being privileged mail. Authenticating the postal mail may involve verifying the identity of a person sending a postal mail item and verifying that the person sending the postal mail item is certified, licensed, or otherwise titled as a professional of a type associated with privileged mail communications, e.g., an attorney, a public official, a physician, a psychologist, a psychologist, another licensed mental health therapist, etc. Authenticating the postal mail may involve confirming that the postal mail item sent by the privileged sender is the same as the postal mail item received by the confinement institution for the inmate.

20 Claims, 4 Drawing Sheets

(56) References Cited

U.S. PATENT DOCUMENTS

| | | | | |
|---|---|---|---|---|
| 6,513,003 | B1 | 1/2003 | Angell | |
| 6,609,196 | B1 | 8/2003 | Dickinson, III | |
| 6,668,045 | B1 | 12/2003 | Mow | |
| 7,161,108 | B2 | 1/2007 | O'Connell | |
| 7,502,451 | B2 | 3/2009 | Gyllenskog | |
| 7,537,203 | B2 | 5/2009 | DeWitt | |
| 7,693,942 | B2 | 4/2010 | Nale | |
| 7,804,941 | B2 | 9/2010 | Keiser | |
| 7,853,629 | B2 | 12/2010 | Duncan | |
| 8,031,850 | B2 | 10/2011 | Polozola et al. | |
| 8,204,177 | B2 | 6/2012 | Harper | |
| 8,331,677 | B2 | 12/2012 | Foehr | |
| 8,498,937 | B1 | 7/2013 | Shipman, Jr. et al. | |
| 8,588,528 | B2 | 11/2013 | Chapman | |
| 8,676,273 | B1 | 3/2014 | Fujisaki | |
| 8,750,486 | B1 | 6/2014 | Keiser | |
| 9,106,789 | B1 | 8/2015 | Shipman, Jr. et al. | |
| 9,178,862 | B1 | 11/2015 | Daniel | |
| 9,311,627 | B1 | 4/2016 | Shipman, Jr. | |
| 9,485,254 | B2 | 11/2016 | Kuang | |
| 9,742,935 | B1 | 8/2017 | Shipman, Jr. | |
| 10,291,617 | B2 | 5/2019 | Logan | |
| 10,320,969 | B2 | 6/2019 | Chang | |
| 10,405,007 | B2 | 9/2019 | Hodge | |
| 10,659,630 | B2 | 5/2020 | Logan | |
| 10,862,891 | B2 | 12/2020 | Logan | |
| 11,151,278 | B1 | 10/2021 | Townsend, III | |
| 11,151,279 | B1 | 10/2021 | Townsend, III | |
| 11,178,278 | B2 | 11/2021 | Rana, III | |
| 11,201,974 | B2 | 12/2021 | Logan | |
| 11,256,397 | B1 | 2/2022 | Townsend, III | |
| 11,258,981 | B2 | 2/2022 | Humphries | |
| 11,734,447 | B1 | 8/2023 | Townsend, III | |
| 11,856,325 | B2 | 12/2023 | Humphries | |
| 11,908,035 | B2 | 2/2024 | Hutson | |
| 11,914,742 | B1 | 2/2024 | Townsend, III | |
| 2003/0072469 | A1 | 4/2003 | Alden | |
| 2003/0074477 | A1 | 4/2003 | Fukushima | |
| 2003/0177115 | A1 | 9/2003 | Stern | |
| 2004/0131281 | A1* | 7/2004 | Reiners | G06V 10/32 382/302 |
| 2005/0114192 | A1 | 5/2005 | Tor et al. | |
| 2006/0031086 | A1 | 2/2006 | Miles | |
| 2006/0245559 | A1 | 11/2006 | Hodge | |
| 2006/0253405 | A1* | 11/2006 | Nirenberg | G06Q 50/60 705/401 |
| 2006/0271400 | A1 | 11/2006 | Clements et al. | |
| 2007/0071206 | A1 | 3/2007 | Gainsboro et al. | |
| 2007/0226088 | A1 | 9/2007 | Miles | |
| 2009/0052804 | A1 | 2/2009 | Lewis | |
| 2009/0282009 | A1 | 11/2009 | Levey | |
| 2010/0299761 | A1 | 11/2010 | Shapiro | |
| 2011/0047473 | A1 | 2/2011 | Hanna et al. | |
| 2011/0119730 | A1 | 5/2011 | Eldar | |
| 2012/0266219 | A1 | 10/2012 | Coleman | |
| 2013/0179949 | A1 | 7/2013 | Shapiro | |
| 2013/0226678 | A1 | 8/2013 | Perna | |
| 2014/0006148 | A1 | 1/2014 | Perna | |
| 2014/0136628 | A1 | 5/2014 | Davis, Jr. | |
| 2014/0229558 | A1 | 8/2014 | Ricci | |
| 2015/0215254 | A1 | 7/2015 | Bennett | |
| 2015/0373031 | A1 | 12/2015 | Hockings | |
| 2020/0036663 | A1* | 1/2020 | Pickens | H04L 67/10 |
| 2020/0387998 | A1* | 12/2020 | Hutson | G06Q 50/26 |
| 2020/0396347 | A1* | 12/2020 | Logan | G06V 30/416 |
| 2021/0065099 | A1* | 3/2021 | Dixon, Jr. | G06K 19/06028 |
| 2022/0060475 | A1* | 2/2022 | Logan | G06V 30/153 |
| 2022/0377035 | A1 | 11/2022 | Shapiro | |
| 2023/0297944 | A1* | 9/2023 | Smith | G06Q 10/0837 705/340 |

FOREIGN PATENT DOCUMENTS

| | | | |
|---|---|---|---|
| CN | 101950383 | A | 1/2011 |
| CN | 114520797 | B | 5/2022 |
| EP | 2549427 | A1 | 1/2013 |
| WO | 2001067772 | A1 | 1/2001 |
| WO | 2006046956 | A1 | 5/2006 |

OTHER PUBLICATIONS

Instantfundas, "6 services to send and receive snail mail through the web", http://www.instantfundas.com/2008/04/6-services-to-send-and-receive-snail.html, 6 pages, Apr. 5, 2008.

Gearhart, G., "Controlling Contraband", CT Feature, 3 pages, 2006.

Stern, M.L., "Prison Mail Censorship: A Nonconstitutional Analysis", Hastings Law Journal, vol. 23., Issue 4, 47 pages, 1972.

* cited by examiner

PRIVILEGE AUTHENTICATION SYSTEMS AND TECHNIQUES FOR COMMUNICATIONS TO CONFINEMENT INSTITUTION INMATES

RELATED APPLICATIONS

This patent application claims the benefit of U.S. Provisional Application No. 63/544,345, entitled "PRIVILEGE AUTHENTICATION SYSTEMS AND TECHNIQUES FOR COMMUNICATIONS TO CONFINEMENT INSTITUTION INMATES," and filed on Oct. 16, 2023, which is incorporated herein by this reference in its entirety.

TECHNICAL FIELD

The present disclosure generally relates to systems, methods, and devices for assigning privileged status to communications involving inmates of confinement institutions and non-inmate persons (e.g., communications involving lawyers, doctors, counselors, clergy, etc.) based on authentication of non-inmate person status.

BACKGROUND

Postal mail to inmates of confinement institutions may be treated specially if it is determined to be privileged postal mail. Prison officials' ability to inspect and censor postal mail may depend on whether the postal mail is privileged or not. Privileged postal mail may be entitled to greater confidentiality and freedom from censorship and thus may be subject to less scrutiny than non-privileged postal mail. In some confinement systems, postal mail processes deliver regular, non-privileged postal electronically (e.g., by scanning the paper mail into electronic scans), while delivering privileged postal mail to the inmates in original (e.g., paper) form. Due to the reduced scrutiny and original form delivery (e.g., paper rather than scanned), privileged postal mail presents opportunities for misuse and abuse. For example, there is the possibility that postal mail that should not be privileged will be sent to an inmate in a way that impersonates privileged mail to facilitate illicit purposes, e.g., to deliver drugs and other prohibited materials to an inmate inside a postal mail package.

SUMMARY

Some implementations disclosed herein reduce the chances of misuse and abuse of privileged postal mail processes by authenticating incoming mail that purports to be privileged mail actually as being privileged mail. Authenticating the postal mail may involve verifying the identity of a person sending a postal mail item and verifying that the person sending the postal mail item is certified, licensed, or otherwise titled as a professional of a type associated with privileged mail communications, e.g., an attorney, a public official, a physician, a psychologist, a psychologist, another licensed mental health therapist, etc. Authenticating the postal mail may involve confirming that the postal mail item sent by the privileged sender is the same as the postal mail item received by the confinement institution for the inmate.

Some implementations involve a method performed via a processor, e.g., executing instructions stored in a non-transitory medium. One such method involves receiving an electronic communication from a sender, wherein the electronic communication comprises a first image depicting a postal item to be sent to an inmate of a confinement institution, the first image captured prior to sending the postal item to be sent. The first image may depict one or both sides of the postal item to be sent. The method further involves determining that the sender is a person having a privileged status. This may involve verifying sender identity, sender license, sender certified, sender title, etc. The method further involves receiving a second image captured after a received postal item is received at a receiving facility (e.g., the confinement facility or a processing center), the second image depicting the received postal item. The method further involves verifying that the received postal item depicted in the second image matches the postal item to be sent depicted in the first image. The method further involves based on the determining that the sender is a person having the privileged status and the verifying that the received postal item depicted in the second image matches the postal item to be sent depicted in the first image, determining to apply a privileged communication status to the received postal item. The privileged communication status may result in different treatment of the postal item (as opposed to un-privileged communications), e.g., resulting in delivering to the inmate without opening, treating the item as confidential, determining to avoid inspection/censorship of the item, providing the privileged mail as physical mail to the inmate (as opposed to scanning and providing non-privileged mail as electronical items available in an electronic briefcase), etc.).

In accordance with some implementations, a device includes one or more processors, a non-transitory memory, and one or more programs; the one or more programs are stored in the non-transitory memory and configured to be executed by the one or more processors and the one or more programs include instructions for performing or causing performance of any of the methods described herein. In accordance with some implementations, a non-transitory computer readable storage medium has stored therein instructions, which, when executed by one or more processors of a device, cause the device to perform or cause performance of any of the methods described herein. In accordance with some implementations, a device includes: one or more processors, a non-transitory memory, and means for performing or causing performance of any of the methods described herein.

BRIEF DESCRIPTION OF THE FIGURES

These and other features, implementations, and advantages of the present disclosure are better understood when the following Detailed Description is read with reference to the accompanying drawings.

DESCRIPTION

Some implementations disclosed herein reduce the chances of misuse and abuse of privileged postal mail processes by authenticating incoming mail that purports to be privileged mail actually as being privileged mail. Authenticating the postal mail may involve verifying the identity of a person sending a postal mail item and verifying that the person sending the postal mail item is certified, licensed, or otherwise titled as a professional of a type associated with privileged mail communications, e.g., an attorney, a public official, a physician, a psychologist, a psychologist, another licensed mental health therapist, etc. Authenticating the postal mail may involve confirming that the postal mail item sent by the privileged sender is the same as the postal mail item received by the confinement institution for the inmate.

Figure 1:
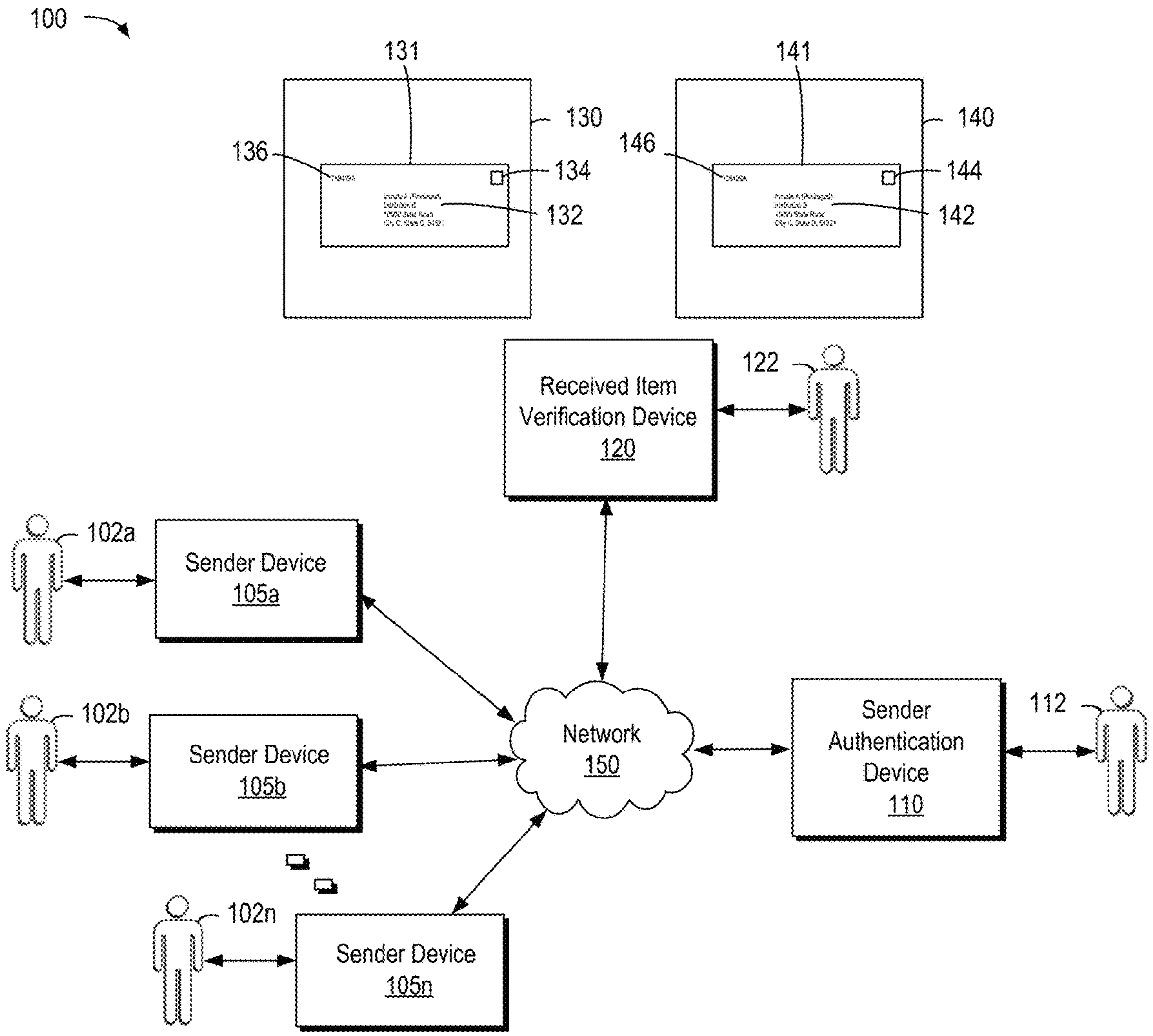
FIG. 1 illustrates a computing environment according to some implementations disclosed herein.

FIG. 1 is a diagram of an environment in which one or more implementations of the present disclosure can be practiced. In a particular implementation, devices and the communications between them as well as the allocation of functionality amongst the multiple devices involved can be configured differently depending upon the particular circumstances of the implementation.

In FIG. 1, one or more senders 102*a-n* use sender devices 105*a-n* to provide information prior to sending postal packages to one or more recipient inmates of one or more confinement institutions. The senders may send electronic communications (e.g., e-mail, texts, webpage submissions, etc.) via network 150 that are processed via one or more devices operated by one or more confinement facilities and/or one or more associated processing facilities. In this example, a sender authentication device 110 (operated autonomously and/or by a user such as user 112) sends and receives communications with the one more sender devices 105*a-n* to authenticate the sender's identities (e.g., as persons having privileged status) and/or obtains information used to verify that postal items sent by such persons match with postal items that are received. In some implementations, the device 110 includes software modules that facilitate the authentication of privileged senders and/or obtaining and assessing of information about such users and/or postal items to be sent by such senders.

In the example of FIG. 1, sender 102*a* uses sender device 105*a* to capture an image 130 of a postal item to be sent. The image 130 includes a depiction 131 of the postal item to be sent, including a depiction of text 132 describing the recipient's identity (e.g., name and address, inmate identifier, etc.), postage information 134, and sender text information (e.g., senders name, authorization code, etc.). The sender device 105*a* may send this image 130 to the sender authentication device (e.g., via network 150), where it is evaluated and/or stored for future matching/verification of the received postal item. The sender authentication device 110 may send a notification or other message to the sender device 105*a* if more information and/or additional information should be presented on the postal item and a new image captured. This process may iteratively continue until one or more criteria are satisfied, e.g., requiring sufficiently unique appearance, sufficient recipient information, sufficient sender information, etc.

The sender 102*a* (or an associate such as a paralegal, secretary, authorized agent, etc.) then sends the postal item via a postal deliver service. The postal item may be received at the confinement facility or an associated processing center where it will be evaluated, e.g., to determine whether it will be treated as a privileged communication or not.

Such evaluation, in this example, is performed via the received item verification device 120, which may operate autonomously, or under the control of a user such as user 122. A second image of the received postal item is captured. In this example, the second image includes a depiction 141 of the received postal item, including a depiction of text 142 describing the recipient's identity (e.g., name and address, inmate identifier, etc.), postage information 144, and sender text information (e.g., senders name, authorization code, etc.).

The received item verification device 120 may then verify that the received package matches the package identified to be sent by the sender 102*a*. This may involve comparing the first image 130 to the second image 140. In some implementations, this comparison is performed manually. For example, the received item verification device 120 may present the first and second images simultaneously via a user interface (e.g., next to one another) so that the user 122 can visually compare them and confirm whether they match or not. Alternatively, an automatic matching algorithm or machine learning based process may be utilized to determine whether the depictions of the postal items in the first and second images match one another. This may involve segmenting the images to remove background/non-postal item portions, identifying features within the postal item portions of the images, and then comparing these portions. A threshold confidence level in a match may be required to identify that there is a match.

If the received postal item is determined to match the sent postal item, it is treated as a privileged communication.

Some implementations described herein utilize a process that uses (a) information from a sender prior to sending a postal mail package and (b) information about a postal mail package received at a confinement facility to verify the identity and status of a sender of the postal mail, the privileged status of the postal mail, and/or that the postal mail package that is received is the same as the postal mail package that was sent. In some implementations, a method is performed that receives a request from a sender to authenticate the privileged status of the sender and/or for authorization to send one or more privileged packages to one or more inmates. The request may include an identification of a sender and/or information about the postal mail package. The request may include one or more images that depict the sender and/or the postal package (e.g., the exterior of one or both sides of the envelope containing a privileged letter). The request may include the sender's name, sender's title, sender's occupational data, sender's associated professional organizations (e.g., state bar association names). The request may include information about the postal mail package such as "to" and "from" information presented on an outer surface of the postal mail package, the color of the postal mail package, one or more dimensions of the postal mail package, the weight of the postal mail package, etc.

The method may authentic the sender by verifying that the sender's identity (e.g., provided in the sender information of a request to authenticate the sender or authorize a privileged package(s) to inmate(s)) is that of an actual privileged sender and that the request came from that privileged sender. The system may authenticate the sender and/or authorize the sending of the privileged postal mail and provide a response to the sender. Such a response may be provided to the sender by the sender's application and may notify/instruct the sender to send the postal mail package without altering the postal mail package. Once the postal mail package is received, e.g., at a confinement institution or processing center, the method verifies that the package is the same as the package that was sent. In some implementations, one or more images of the postal mail package are captured and compared (manually or automatically) to the previously captured images of the package. If the received postal mail package is determined to be the same as the sent package, then the package is delivered to the recipient inmate.

The following is an exemplary process (in accordance with some implementations) for authenticating privileged postal mail. In this example, an attorney (i.e., sender) accesses a postal mail application on a computing device such as a mobile phone, tablet, laptop, desktop, head-mounted-device (HMD), etc. The attorney uses the application to submit credentials to be approved by an administrator (e.g., a jail or prison administrator, or a third-party administrator). The submission of credentials may include the attorney (i.e., sender) providing a photograph of themselves (e.g., a selfie) that is matched with a trusted image of the attorney, e.g., an image of the attorney from a state's bar association website, database, or the like. Credentials may include attorney name, address, state(s) of bar membership, bar number, and/or other information relevant to confirming the sender's identity as a member of a state bar. The attorney may also provide an inmate name and/or inmate ID that identifies the inmate recipient expected to be the recipient of one or more postal mail communications from the inmate. In another example, the attorney provides an image of the postal mail package, and the recipient information is identified (e.g., via optical character recognition).

The attorney sender's identity may be verified by sending one or more communications to the attorney at one or more trusted electronic addresses. For example, the attorney identity may be verified by e-mailing the attorney at an e-mail address trusted to be associated with the attorney or texting the attorney at a phone number trusted to be associated with the attorney, e.g., using contact information for the attorney from a state's bar association website, database, or the like. In some implementations, verification of the sender as being the attorney that the sender purports to be is based on sending and/or receiving communications with the attorney at one or more trusted electronic addresses. In one example, an e-mail is sent to the attorney at an e-mail address associated with the attorney on a state's website, database, etc. (e.g., where the sender identifies he or she is a member of the bar). Such an e-mail may request a reply confirming the attorney's identity as the person who is requesting to send postal mail to an inmate (e.g., "Please reply 'yes' to confirm that you are an attorney in good standing in state [S] having an attorney-client relationship with inmate [I], and that you have, or someone under your direction has, requested access to send privileged postal mail to this inmate.") The attorney may reply (e.g., by sending an e-mail message back that includes 'yes' in the e-mail message subject line or body). The attorney may also reply by providing photographs of attorney staff members who the attorney authorizes to help them send privileged postal mail, e.g., at the attorney's direction.

Alternatively (or additionally) the e-mail message may include response links or button that the e-mail recipient attorney selects to initiate an automatic reply (via e-mail or other electronic communication) confirming the requested information.

Alternatively (or additionally), the e-mail message to an attorney may include a unique code that the sender then enters into the postal mail application to confirm their identity, attorney status, the existence of an attorney-client relationship with the inmate, and/or other information relevant to verify the identity of the sender for privileged status purposes.

The identities of other types of professionals (e.g., a public official, a physician, psychologists, another licensed mental health therapist, etc.) can be similarly confirmed based on information provided by a requesting sender and publicly available information about the professionals (e.g., using images and/or contact information from trusted sources associated with the identities that the senders assert are their own).

Returning to the discussion of the exemplary process, once approved/verified, the attorney is enabled to send postal mail that will be treated as privileged mail based on the approval/verification. This may involve enabling the inmate to send postal mail that will be treated as privileged mail to a specific inmate, at a specific confinement institution (e.g., jail, prison, etc.), and/or for a specified period of time. In some implementations, an attorney is approved/verified to send postal mail to a set of multiple identified inmates at one or more confinement institutions through a single approval process. Attorney verification/approval may be limited in duration, e.g., 1 week, 1 month, 6 months, 1 year, etc. Requiring periodic re-verification/re-approval may help ensure that the privileged status is still applicable, e.g., that the attorney is still a member of the bar in good standing, that an attorney-client relationship still exists, that the inmate is still in the previously identified institution, etc.

When the attorney sends postal mail to an inmate, the attorney records or captures information about the postal mail. In some implementations, the attorney captures a picture (e.g., via the camera on a mobile device, tablet, laptop, etc.) of the envelope or other package containing the postal mail contents. In some implementations, the attorney captures a picture of the envelope and himself/herself or a member of the attorney's staff, e.g., in a single image. In some implementations, the attorney captures multiple pictures, e.g., of both sides of the package. In some implementations, the attorney measures and/or weights the postal mail package to identify dimensions, weight, and/or other characteristics of the postal mail package.

Preferably (but not necessarily) the attorney has already affixed, written, or printed postal address information (e.g., identifying the inmate, confinement facility, postal address, etc.) and/or postal payment information (e.g., stamp(s) and/or printed postal payment information) to the package prior to capturing a picture of the postal mail package. Preferably (but not necessarily) the person captures at least one picture of the package in which some or all of the postal address or postal payment information is visible. Such information on the package in the captured pictures may facilitate accurate identification of the package and/or confirmation that it is the same package when it is received at the confinement facility. The picture(s) of the postal mail (e.g., one or more pictures of the outside of the package and/or the attorney/attorney staff) are then sent for recipient verification. This may involve using an upload tool on the application to upload the picture(s) to an electronic location or service that will make the pictures available to administrators handing postal mail received at the confinement institutions to which the postal mail is directed. Information about package dimensions, weight, and other attributes may similarly be provided.

An uploaded photo of the attorney (or attorney staff) may be assessed to confirm that the person sending the postal mail (e.g., in a photo with the postal mail package) is actually the attorney or a staff member authorized by the attorney. In some implementations, an application is configured to compare a picture of the approved attorney (or their staff who send mail) to the picture of the attorney/staff sending the mail. If not the same, the application may notify the sender who submitted the postal mail package picture that the submission is NOT APPROVED. In some instances, an attorney's prior approval may have expired, and the attorney may be required to be re-approved. In some implementations, an attorney is notified, e.g., via e-mail when approval is about to expire or has already expired (e.g., via the attorney's trusted electronic communications address (es)).

During the approval process (prior to sending), an uploaded photo of the postal mail package and/or information about its characteristics may be assessed to determine whether the information includes sufficiently unique attributes for later verification. For example, this may involve assessing the photo to determine whether it includes "to" address information, "from" address information, and/or postal payment information (e.g., postage stamp(s) and/or payment markings). If sufficient unique information is not found, the sender may receive a message to add such information and submit one or more new pictures of the update package's appearance.

The postal mail is sent via the postal mail system (e.g., the U.S. Postal Service) to the confinement institution. Note that in some implementations, the postal mail is first directed to a processing center separate from the confinement institution for privileged status verification prior to being forwarded on to the confinement institution. Thus, the postal mail may be addressed to a confinement institution address or a processing center address.

The postal mail is received (e.g., at a confinement institution or a processing center) and a verification process is performed. The verification process involves capturing one or more pictures of the received postal mail package (e.g., the front and/or back of the package) and comparing those with the one or more pictures captured by the attorney prior to sending. Comparison of dimensions, weights, and/or other information about the characteristics of the postal mail package may also be performed. The comparisons may be manual, automatic, or semi-automatic.

In one example, a confinement institution receives mail purporting to be privileged mail (e.g., by being addressed to an address used for privileged postal mail), and an officer or other administrator uses a phone (or other electronic device) to access a verification application to perform a verification process. The verification process may involve:

1. An officer using an application to receive the previously-captured pictures (e.g., the picture(s) captured by the sending attorney/staff)—the officer may look up the previously-captured pictures, for example, by entering information from the postal mail address information (e.g., "to" or "from" info) on the postal mail package (e.g., the recipient inmate's last name and/or sender's last name) in an electronic search engine;
2. The officer visually comparing the received postal mail package (e.g., in hand) or to the one or more pictures of the sent package displayed on the application; and
3. The officer determining, based on the visual comparison, whether the received postal mail package is the same package that was sent by an authorized privileged sender and thus should be treated as privileged mail and/or delivered to the inmate, or rejected and/or returned to sender.

In another example, the verification process may involve:

1. An officer using an application to identify the previously-captured pictures (e.g., the picture(s) captured by the sending attorney/staff)—the officer may look up the previously-captured pictures, for example, by entering information from the postal mail address information on the postal mail package in an electronic search engine;
2. The officer taking one or more pictures of the received postal mail package (e.g., front and/or back of package);
3. An application comparing the officer's picture(s) of the received package to the picture(s) of the sent postal mail package sent by the approved attorney;
4. Determining, based on the application comparison, whether the received postal mail package is the same package that was sent by an authorized privileged sender and thus should be treated as delivered to the inmate and/or treated privileged mail or rejected and/or returned to sender.

In some implementations, mail purporting to be privileged is fed through (e.g., placed in an input slot or on a conveyer belt feeding into) a processing device or assembly. Such a device or assembly may automatically position each postal packages for image capture, determine dimensions, weight, and/or other characteristics, such as scanning for drugs, of each postal mail package, take one or more pictures of each postal mail package, identify previously captured pictures for comparison (e.g., based on an automatic search/lookup using the postal mail address info on the package). The information and/or pictures may then be compared to determine whether each received postal mail package is the same package that was sent by an authorized privileged sender and thus should be treated as delivered to the inmate and/or treated as privileged mail. In this example, minimal or no manual participation may be required by the officers or processing facility staff. For example, the mail may be simply manually fed into the device and the remaining processing performed automatically until authenticated privileged mail is ready to be delivered to an inmate.

In some implementations, an officer or processing facility staff member wears a head mounted display (HMD) that is configured to capture pictures (e.g., via an outward facing camera on the HMD) and/or recognize received mail in the captured pictures that corresponds to postal mail packages in sent pictures of privileged mail sent from one or more attorneys. Such a process may similarly involve minimal officer/staff participation. For example, an officer or other staff member may quickly flip through a stack of postal mail briefly looking at each of the pieces of postal mail. During such looks, the HMD may capture sufficient information about each postal mail package, e.g., via image or other sensors on the HMD, to perform a verification process.

In some implementations, such an HMD may additionally or alternatively be used to locate lost inmate tablets (e.g., via image recognition processes of pictures captured in inmate areas), ID inmates (e.g., based on pictures captured of inmates), and/or provide other data in the environment (e.g., assessing whether the jail is clean, in need of maintenance, in an unexpected state (e.g., doors open that should be closed), etc.)

Once approved, e.g., via comparison with previously captured pictures of the sent postal mail package, the received postal mail package may be provided to the appropriate inmate. For example, if approved, an officer would give or deliver the approved postal mail package to an inmate.

A delivery confirmation of the privileged mail package showing a time stamp that the postal mail package was delivered to the inmate (e.g., date, time, by officer, etc.) may be sent to the sending attorney/staff and confinement institution administrator (e.g., via an application or other electronic communication).

Any postal mail purporting to be privileged but not satisfying the privileged verification processes, may be refused and/or returned to sender.

Information about the attorney approval/verification, sending package approval/verification, the action/event of an attorney/staff sending a postal mail package, the action/event of a facility receiving of the postal mail package, the verification of the postal mail package as being privileged mail, and/or the action/event of the delivery of the postal mail package to the inmate may be retained for future access, e.g., to provide in history reports given to an investigator when abuse or misuse is suspected or identified.

In some implementations, a person is authenticated as having a particular status (e.g., being a lawyer, doctor, etc. to whom privileged communications with inmates are appropriate. Such status may be authenticated based on information provided by the person and/or using information from data records that confirm such status, e.g., medical board databases, state legal bar databases, databases of legal system officials, etc. In some implementations, a single system and/or user interface is used for (a) authenticating the status of a person (b) initiating privileged postal mail transactions involving the authenticated person and the one or more inmates (c) initiating privileged electronic mail/message communications involving the authenticated person and one or more inmates and/or (d) initiating privileged voice calls or video visitation sessions involving the authenticated person and one or more inmates. Using a single system for multiple features (e.g., (a)-(d)) can provide a more desirable user interface and reduce the amount of administration time required by confinement institution and/or authentication service staff.

In some implementations, once a person has been authenticated as having a status associated with privileged communication (e.g., as being an inmate's lawyer, doctor, priest, etc.), the system presents multiple communications options or otherwise facilitates communicating with one or more inmates (e.g., by postal mail, electronic mail, text message, e-mail message, phone call, voice message, electronic document transfer, etc.). In one example, an attorney may desire to send a postal mail message to an inmate and go through an approval process using the system. However, upon being approved, the attorney may see the option to communicate in other ways and choose another communication mode. For example, once the attorney has been approved, the attorney may decide that a digital version of the document would be sufficient to send their client (an inmate). To maintain privacy, the attorney may notify the facility (e.g., jail) that they are sending an inmate legal correspondence in digital form. This could be, for example, via an app or web portal that will forward the document to an electronic briefcase folder that is only accessible to the inmate. The facility (e.g., facility staff) may be provided with the option, e.g., via an app or web portal, to see that a document has been sent and review the sender (e.g., name, status, credentials, etc.) and information about the recipient. The facility (e.g., facility staff) may be presented with a user interface to approve access to the communication for the inmate, without the facility staff being able view the content of the communication. This provides the facility staff with an opportunity to flag suspicious behavior (e.g., an unusual amount of communications involving one attorney or inmate). The attorney could be notified by the system that the document forwarding was approved or denied and notified when the inmate accessed/accesses the document. The inmate may be enabled by the system with the ability to delete the electronic document, or the attorney could assign a time limit for the inmate to retain the document.

In some implementations, a person has been authenticated as having a status associated with privileged communication (e.g., as being an inmate's lawyer, doctor, priest, etc.) is enabled to send duplicate copies of a privileged communication via multiple different communications channels (e.g., as both postal mail and via electronic document delivery). Doing so may be desirable to better ensure that an inmate receives, is aware of, enabled to acknowledge receipt, and/or enabled to respond (e.g., by a responsive electronic or postal communication). In some implementations, an electronic document or other electronic communication provides a means for an inmate to sign and return documents to a sender. In some implementations, the system enables a person that has been authenticated as having a status associated with privileged communication (e.g., as being an inmate's lawyer, doctor, priest, etc.) to flag a communication (e.g., postal or electronic) to an inmate as high priority or assign a deadline that is used by the system to remind the inmate. For example, an inmate may send a document for an inmate to sign with a high-priority flag and a deadline 1 week from now for the signature and the system may remind the inmate about the deadline, e.g., the day before and the day of the deadline.

Figure 2:
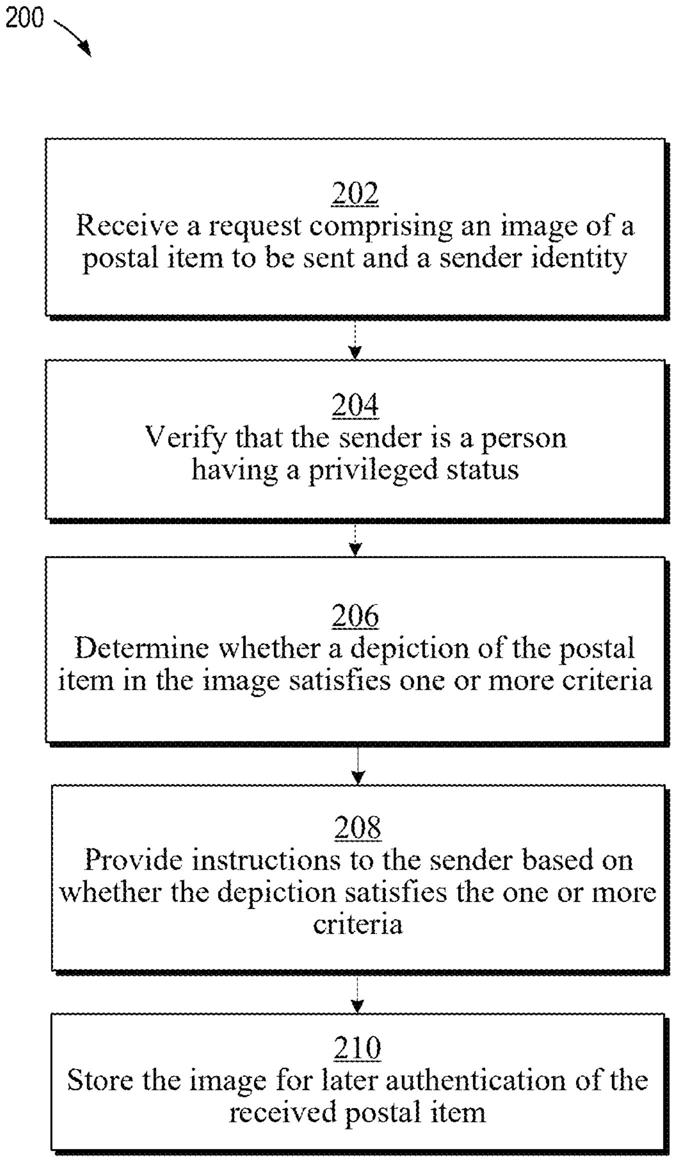
FIG. 2 is a flow chart illustrating an exemplary method for authenticating a privileged sender of communications to a confinement institution according to some implementations disclosed herein.

FIG. 2 is a flow chart illustrating an exemplary method 200 for authenticating a privileged sender of communications to a confinement institution. The method 200 can be implemented via a computing device, for example, by storing and using a processor to execute instructions in a non-transitory computer-readable medium. Reference to the method being performed by a computing device includes the method being performed by one or more computing devices and/or using one or more processors.

The method 200, at block 202, involves receiving a request comprising an image of a postal item to be sent and a sender identity. For example, such an image may be captured by an attorney, doctor, or other person associated with privileged communications with an inmate and sent via an electronic communications network (e.g., the internet) and then received by a sender authentication service (e.g., sender authentication device 110 of FIG. 1). The sender identity may be provided in various forms, e.g., text identifying the name, bar number, professional association membership number, social security number, driver's license number, etc., encrypted information, e.g., an encrypted identifier, login information (e.g., user/account id, password, etc.), one or more images of the sender, one or more images of the sender with the postal item etc.

At block 204, the method 200 further involves verifying that the sender is a person having a privileged status. For example, this may involve matching sender identity information (e.g., text, login info, image data, etc.) with information known to be associated with a person having a privileged status. The verification may be performed by a sender authentication service, e.g., via sender authentication device 110 of FIG. 1, using local information or information accessible via a network, e.g., by accessing websites and network services of professional associations to obtain current information about individuals have certain accreditations, memberships, roles, etc. that are associated with persons having privileged status.

At block 206, the method 200 further involves determining whether a depiction of the postal item in the image satisfies one or more criteria. For example, this may involve confirming that the image is sufficiently clear, e.g. not blurry, that the postal image occupies a sufficient area (e.g., number of pixel) in the image, that sufficient information is presented on the postal item (e.g., recipient name, facility name, sender identity, postage, etc.), that the postal item is sufficiently unique (e.g., containing more than just background and computer-generated text, i.e., having a combination of characteristics likely to be unique and difficult to reproduce, such as including hand-written information, a unique code provided by the authentication service, a fingerprint, markings or imperfections at particular positions, etc.). In some implementations, the depiction of the postal item is required to contain particular information that is unique to that postal item.

At block 208, the method 200 further involves providing instructions to the sender based on whether the depiction satisfies the one or more criteria. If the depiction does satisfy the one or more criteria, for example, this may involve instructing the sender to send the postal item without further modification (e.g., taking care not to mark, bend, rip, etc. the postal item). If the depiction does not satisfy the one or more criteria, for example, this may involve instructing the sender to correct one or more deficiencies so that the criteria will be satisfied, e.g., instructing the sender to add information, unique markings, postage, include themselves in the next image, capture the next image from closer range or with the postal item orthogonal to the image capture direction, use a higher resolution setting when capturing the next image, focus the camera when capturing the next image, etc. This process may iterate (e.g., receiving images and providing instructions to the sender) until an acceptable image (or more than one) of the postal item is received.

At block 210, the method further involves storing the image for later authentication of the received postal item. This may involve transferring the image to a received item verification service (e.g., received item verification device 120 of FIG. 1) and/or associating the image with a particular inmate (e.g., the intended recipient), confinement facility (e.g., the recipient's facility) and/or staff member (e.g., one or more staff members at the facility responsible for received item verification.

Figure 3:
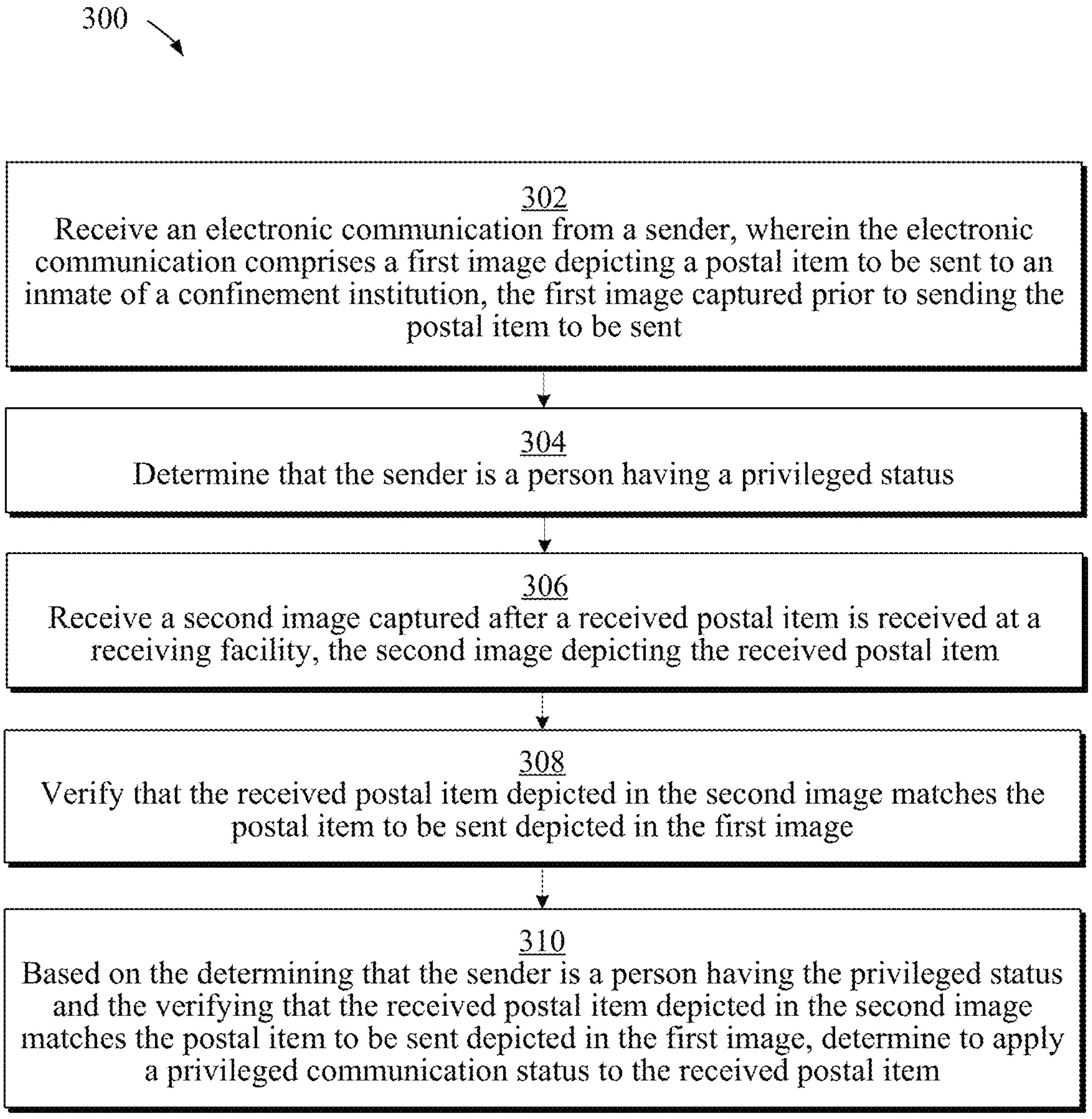
FIG. 3 is a flow chart illustrating an exemplary method for authenticating privileged postal communications to a confinement institution according to some implementations disclosed herein.

FIG. 3 is a flow chart illustrating an exemplary method 300 for authenticating privileged postal communications to a confinement institution according to some implementations disclosed herein. The method 300 can be implemented via a computing device, for example, by storing and using a processor to execute instructions in a non-transitory computer-readable medium. Reference to the method being performed by a computing device includes the method being performed by one or more computing devices and/or using one or more processors.

The method 300, at block 302, receiving an electronic communication from a sender, wherein the electronic communication comprises a first image depicting a postal item to be sent to an inmate of a confinement institution, the first image captured prior to sending the postal item to be sent. The electronic communication may include an image depicting one or more sides of the postal item to be sent. The first image may depict both a front side and a back side of the postal item to be sent. The first image may depict both the sender and the postal item to be sent. The electronic communication may include multiple images, e.g., of the postal item alone, the sender alone, the postal item and the sender together, or a combination thereof.

Receiving the electronic communication from the sender may involve receiving a request from the sender for authorization to send one or more privileged packages to one or more inmates. Such a request may include a description of the postal item to be sent, the description describing a color, size dimension, weight of the postal item to be sent, etc. The request may include a picture of the sender.

The method 300 may further involve sending an instruction for the sender to add unique attributes and/or other information to the postal item to be sent and to send an updated first image of the postal item to be sent with the added unique attributes and/or additional information.

The method 300 may involve responding to the electronic communication with a notification to the sender to send the postal item to be sent without alteration.

The method 300 may be a part of a single approval process that is applied to authorize the sender to send multiple postal items having privileged status to one or more inmates of one or more confinement institutions.

At block 304, the method 300 further involves determining that the sender is a person having a privileged status. This may involve verifying the sender's identity, license, membership, certification, title, etc. Determining that the sender is a person having a privileged status may involve, for example, verifying an identity of the sender corresponds to a privileged sender identity and that the electronic communication came from the sender. Determining that the sender is a person having a privileged status may involve, for example, matching an image of the sender received in the electronic communication with a trusted image corresponding to a privileged sender identity. Determining that the sender is a person having a privileged status may involve, for example, sending a second electronic communication to an electronic address associated with a privileged sender identity. The second electronic communication may provide a code for a recipient of the second electronic communication to use to facilitate verification of the sender being a person having privileged status.

At block 306, the method 300 further involves receiving a second image captured after a received postal item is received at a receiving facility (e.g., the confinement facility or a processing center), the second image depicting the received postal item.

At block 308, the method 300 further involves verifying that the received postal item depicted in the second image matches the postal item to be sent depicted in the first image. Verifying that the received postal item depicted in the second image matches the postal item to be sent depicted in the first image may involve an algorithm or machine learning model that compares features depicted in the first image and second image. Verifying that the received postal item depicted in the second image matches the postal item to be sent depicted in the first image may involve comparing postal address information or postal payment information depicted in the first image and second image. Verifying that the received postal item depicted in the second image matches the postal item to be sent depicted in the first image may involve comparing postal address information or postal payment information depicted in the first image and second image.

At block 310, the method 300 further involves, based on the determining that the sender is a person having the privileged status and the verifying that the received postal item depicted in the second image matches the postal item to be sent depicted in the first image, determining to apply a privileged communication status to the received postal item. Determining that the sender is a person having privileged status may result in making the physical postal mail item available to the inmate without opening it first, treating it as confidential, determining to avoid inspection/censorship of the item, etc. In some implementations, non-privileged mail is not made available to the inmate in physical form, while privileged mail is provided in physical form.

The method 300 may involve machinery that includes postal item aligning components, postal item sorting components, image capture components, and/or other components used to facilitate automatic or semi-automatic assessment of whether the postal items correspond to postal items sent by privileged senders. The method 300 may be part of a process sin which postal mail items purporting to be privileged are fed through a processing assembly that automatically: positions each of the postal mail items for image capture; determines dimensions of the postal mail item; determines a weight of each of the postal mail items; and/or checks each of the postal mail items for contraband or prohibited content.

In some implementations, postal mail items purporting to be privileged are analyzed via a machine-based process that automatically: opens the postal mail items; inspects, via a machine learning model or algorithm, contents the opened items for contraband or prohibited content in a manner that prevents human observation of potentially-privileged content of the opened mail items; and reseals contents of the postal mail items for delivery to one or more respective inmate recipients.

In some implementations, the second image (e.g., of a received postal mail item) is captured via an HMD worn on a head of staff member. The staff member may thus manually review the mail items at the same time images are automatically captured and available for us in authenticating the status of privileged postal items. In other implementations, the staff member need not review the mail items but simply positions them in their current view while wherein an HMD (e.g., close enough that adequate images are captured). In such an example, a staff member may sequentially look through a significant number of received postal mail items capturing images automatically for use in identifying which are privileged and which are not. The device may identify privileged postal items in real time, providing feedback (e.g., a beep, indicator light, etc.) such that the staff member can sort/classify received postal mail into privileged and unprivileged groups.

In some implementations, there is uncertainty about whether a received item matches an item sent by a privileged sender, e.g., where a confidence level of an automated process is determined to be less than a predetermined threshold. Various follow up actions may be initiated (automatically or manually), for example, to contact the sender for confirmation/further verification, etc.

Figure 4:
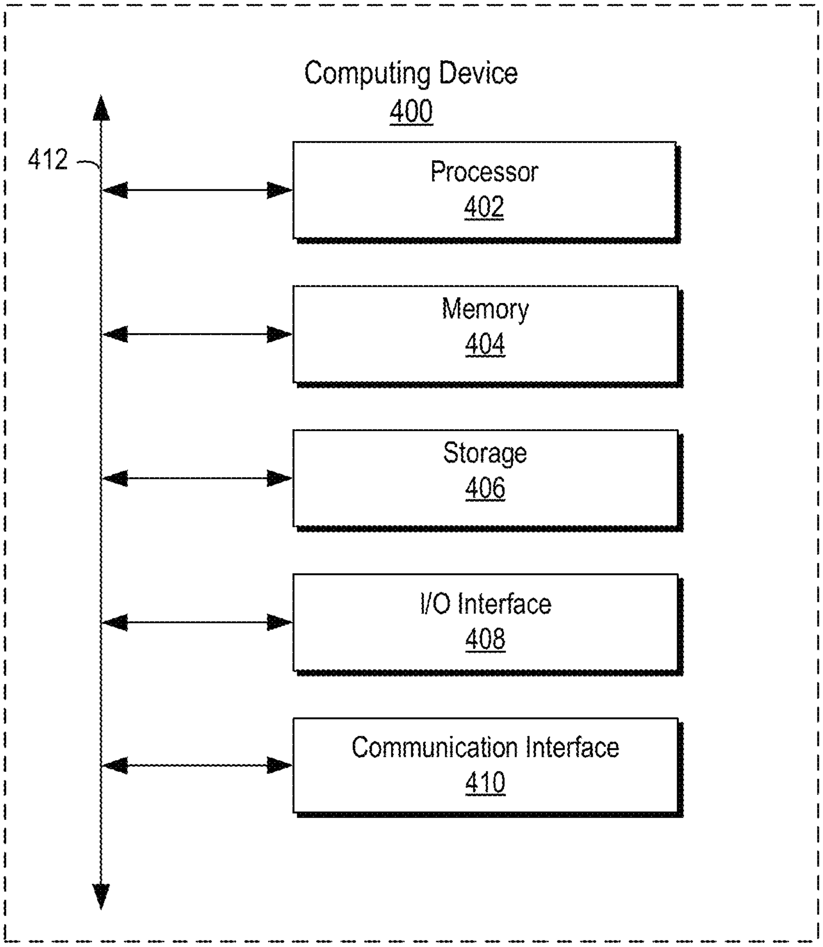
FIG. 4 is a block diagram depicting an example hardware implementation of a device using in authenticating privileged communications to a confinement institution in accordance with some implementations disclosed herein.

FIG. 4 is a block diagram depicting an example hardware implementation for the servers and devices described in FIG. 4. Each such device 400 may include a processor 402 that is communicatively coupled to memory 404 and storage 406 and that executes computer-executable program code and/or access information stored in the memory 404 and storage 406. The processor 402 may comprise a microprocessor, an application-specific integrated circuit ("ASIC"), a state machine, or other processing device. The processor 402 can include any of a number of processing devices, including just a single processing unit. Such a processor 402 can include or may be in communication with a computer-readable medium storing instructions that, when executed by the processor, cause the processor to perform the operations described herein.

The memory 404 and storage 406 can include any suitable computer-readable medium. The computer-readable medium can include any electronic, optical, magnetic, or other storage device capable of providing a processor with computer-readable instructions or other program code. Non-limiting examples of a computer-readable medium include a magnetic disk, memory chip, ROM, RAM, and ASIC, a configured processor, optical storage, magnetic tape or other magnetic storage, or any other medium from which a computer processor can read instructions. The instructions may include processor-specific instructions generated by a compiler and/or an interpreter from code written in any suitable computer-programming language, including, for example, C, C++ C#, Visual Basic, Java, Python, Perl, and JavaScript.

The device 400 may also comprise a number of external or internal devices such as input or output devices. For example, the device 400 may have input/output ("I/O") interface 408 that can receive input from input devices or provide output to output devices. The input devices can include one or more cameras, e.g. used to capture images of postal items to be sent and/or received postal items. A bus 412 can also be included in the device 400. The bus 412 can communicatively couple one or more components.

The device 400 can also include at least one network interface device or other communication interface 410. The communication interface 400 can include any device or group of devices suitable for establishing a wired or wireless data or telephone connection to one or more networks. Non-limiting examples of a network interface device include an Ethernet network adapter, a modem, and/or the like. A device can transmit messages as electronic or optical signals.

An electronic device can be a computer, telephone, mobile device, tablet, smart phone, smart watch, or any communications device, or may be part of a machine such as an assembly line configured to position postal items and capture images of them. A device can include a processor, memory, a bus, input/output components, network interface components, and other appropriate communication components. Non-limiting examples of input devices include a touch screen (e.g., one or more cameras for imaging a touch area or pressure sensors for detecting pressure change caused by a touch), a mouse, a keyboard, or any other device that can be used to generate input events in response to physical actions by a user of a computing device, or a microphone. Input devices may also include one or more cameras or other sensors that obtain information about the environment around the device. Non-limiting examples of output devices include an LCD screen, an external monitor, a speaker, or any other device that can be used to display or otherwise present outputs generated by a computing device. The device can execute program code that configures the processor to perform one or more of the operations described above.

Numerous specific details are set forth herein to provide a thorough understanding of the claimed subject matter. However, those skilled in the art will understand that the claimed subject matter may be practiced without these specific details. In other instances, methods apparatuses, or systems that would be known by one of ordinary skill have not be described in detail so as not to obscure claimed subject matter.

Unless specifically stated otherwise, it is appreciated that throughout this specification discussions utilizing the terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general-purpose computing apparatus to a specialized computing apparatus implementing one or more Implementations of the present subject matter. Any suitable programming, scripting, or other type of language or combinations of languages may be used to implement the teachings contained herein in software to be used in programming or configuring a computing device.

Implementations of the methods disclosed herein may be performed in the operation of such computing devices. The order of the blocks presented in the examples above can be varied for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or value beyond those recited. Headings, lists, and numbering included herein are for ease of explanation only and are not meant to be limiting.

The foregoing description and summary of the invention are to be understood as being in every respect illustrative and exemplary, but not restrictive, and the scope of the invention disclosed herein is not to be determined only from the detailed description of illustrative Implementations but according to the full breadth permitted by patent laws. It is to be understood that the Implementations shown and described herein are only illustrative of the principles of the present invention and that various modification may be implemented by those skilled in the art without departing from the scope and spirit of the invention.

What is claimed is:

1. A method comprising:

at a processor:

receiving an electronic communication via a computing network from a sender, wherein the electronic communication comprises a first image depicting a postal item to be sent to an inmate of a confinement institution, the first image captured prior to sending the postal item to be sent;

determining that the sender is a person having a privileged status;

receiving a second image captured after a received postal item is received at a receiving facility, the second image depicting the received postal item;

verifying, via an image-to-image comparison, that the received postal item depicted in the second image matches the postal item to be sent depicted in the first image, wherein the verifying comprises segmenting the first image and the second image to remove background and non-postal item portions, identifying features within postal item portions of the first image and the second image, comparing the identified features, and requiring a threshold confidence level in a match; and based on the determining that the sender is a person having the privileged status and the verifying that the received postal item depicted in the second image matches the postal item to be sent depicted in the first image, determining to apply a privileged communication status to the received postal item.

2. The method of claim 1, wherein the first image depicts both the sender and the postal item to be sent.

3. The method of claim 1, wherein the first image depicts both a front side and a back side of the postal item to be sent.

4. The method of claim 1, wherein determining that the sender is a person having a privileged status comprises verifying an identity of the sender corresponds to a privileged sender identity and that the electronic communication came from the sender.

5. The method of claim 1, wherein determining that the sender is a person having a privileged status comprises matching an image of the sender received in the electronic communication with a trusted image corresponding to a privileged sender identity.

6. The method of claim 1 further comprising responding to the electronic communication with a notification to the sender to send the postal item to be sent without alteration.

7. The method of claim 1, wherein a single approval process is applied to authorize the sender to send multiple postal items having privileged status to one or more inmates of one or more confinement institutions.

8. The method of claim 1 further comprising sending an instruction for the sender to add unique attributes to the postal item to be sent and to send an updated first image of the postal item to be sent with the added unique attributes.

9. The method of claim 1, wherein postal mail items purporting to be privileged are fed through a processing assembly that automatically:

positions each of the postal mail items for image capture;

determines dimensions of the postal mail item;

determines a weight of each of the postal mail items; and checks each of the postal mail items for contraband or prohibited content.

10. The method of claim 1, wherein postal mail items purporting to be privileged are analyzed via a machine-based process that automatically:

opens the postal mail items;

inspects, via a machine learning model or algorithm, contents of the opened items for contraband or prohibited content in a manner that prevents human observation of potentially-privileged content of the opened mail items; and reseals contents of the postal mail items for delivery to one or more respective inmate recipients.

11. The method of claim 1, wherein the second image is captured via a head-mounted device (HMD) worn on a head of staff member.

12. The method of claim 1, wherein determining that the sender is a person having a privileged status comprises sending a second electronic communication to an electronic address associated with a privileged sender identity.

13. The method of claim 12, wherein the second electronic communication provides a code for a recipient of the second electronic communication to use to facilitate verification of the sender being a person having privileged status.

14. The method of claim 1, wherein verifying that the received postal item depicted in the second image matches the postal item to be sent depicted in the first image comprises an algorithm or machine learning model that compares features depicted in the first image and second image.

15. The method of claim 14, wherein verifying that the received postal item depicted in the second image matches the postal item to be sent depicted in the first image comprises comparing postal address information depicted in the first image and second image.

16. The method of claim 14, wherein verifying that the received postal item depicted in the second image matches the postal item to be sent depicted in the first image comprises comparing postal payment information depicted in the first image and second image.

17. The method of claim 1, wherein receiving the electronic communication from the sender comprises receiving a request from the sender for authorization to send one or more privileged packages to one or more inmates.

18. The method of claim 17, wherein the request includes a description of the postal item to be sent, the description describing a color, size dimension, or weight of the postal item to be sent.

19. The method of claim 17, wherein the request includes a picture of the sender.

20. A system comprising:

a processor;

a non-transitory computer readable medium comprising instructions that, when executed via the processor, cause the system to perform operations comprising:

receiving an electronic communication via a computing network from a sender, wherein the electronic communication comprises a first image depicting a postal item to be sent to an inmate of a confinement institution, the first image captured prior to sending the postal item to be sent;

determining that the sender is a person having a privileged status;

receiving a second image captured after a received postal item is received at a receiving facility, the second image depicting the received postal item;

verifying, via an image-to-image comparison, that the received postal item depicted in the second image matches the postal item to be sent depicted in the first image, wherein the verifying comprises segmenting the first image and the second image to remove background and non-postal item portions, identifying features within postal item portions of the first image and the second image, comparing the identified features, and requiring a threshold confidence level in a match; and based on the determining that the sender is a person having the privileged status and the verifying that the received postal item depicted in the second image matches the postal item to be sent depicted in the first image, determining to apply a privileged communication status to the received postal item.

* * * * *